United States Patent
Miyamoto

(10) Patent No.: US 10,613,749 B2
(45) Date of Patent: Apr. 7, 2020

(54) INFORMATION PROCESSING DEVICE, IMAGE FORMING APPARATUS, AND COMPUTER-READABLE NON-TRANSITORY RECORDING MEDIUM WITH INFORMATION PROCESSING PROGRAM STORED THEREON

(71) Applicant: KYOCERA Document Solutions Inc., Osaka (JP)

(72) Inventor: Takanori Miyamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 113 days.

(21) Appl. No.: 15/944,934

(22) Filed: Apr. 4, 2018

(65) Prior Publication Data
US 2018/0314414 A1    Nov. 1, 2018

(30) Foreign Application Priority Data
Apr. 26, 2017    (JP) .................................. 2017-087267

(51) Int. Cl.
| | |
|---|---|
| G06F 3/0485 | (2013.01) |
| G06F 3/0488 | (2013.01) |
| G06F 3/0481 | (2013.01) |
| G06F 3/0482 | (2013.01) |
| G06F 3/0484 | (2013.01) |

(52) U.S. Cl.
CPC ........ G06F 3/04883 (2013.01); G06F 3/0482 (2013.01); G06F 3/0485 (2013.01); G06F 3/04817 (2013.01); G06F 3/04847 (2013.01)

(58) Field of Classification Search
CPC .... G06F 3/017; G06F 3/03547; G06F 3/0481; G06F 3/048; G06F 3/0482; G06F 3/0484; G06F 3/0485; G06F 3/04842; G06F 3/04833; G06F 3/04817
See application file for complete search history.

(56) References Cited

U.S. PATENT DOCUMENTS

2009/0183121 A1* 7/2009 Konuma ............ H04N 1/00352
                                                                                          715/840
2014/0098402 A1* 4/2014 Komaba ............ G03G 15/5016
                                                                                          358/1.15

FOREIGN PATENT DOCUMENTS

JP        2008-018541 A      1/2008

* cited by examiner

Primary Examiner — William Boddie
Assistant Examiner — Jeffrey Parker
(74) Attorney, Agent, or Firm — IP Business Solutions LLC

(57) ABSTRACT

An information processing device includes: a display section; and control unit functioning as a display control section, gesture receiving section, and setting candidate receiving section. When the gesture receiving section receives a selection gesture performed on a shortcut button, the display control section causes the display section to: (i) display, in the setting screen, a pop-up image showing a setting item and the setting candidate associated with the selected shortcut button; (ii) scroll-display the setting item list displayed on scrolling display area until the setting item associated with the selected shortcut button is displayed in the setting screen; and (iii) move the pop-up image to where the setting item which is in the setting item list and associated with the selected shortcut button is displayed, and display, as the information representing the setting candidate currently set in the setting item list, the setting candidate associated with the shortcut button.

6 Claims, 12 Drawing Sheets

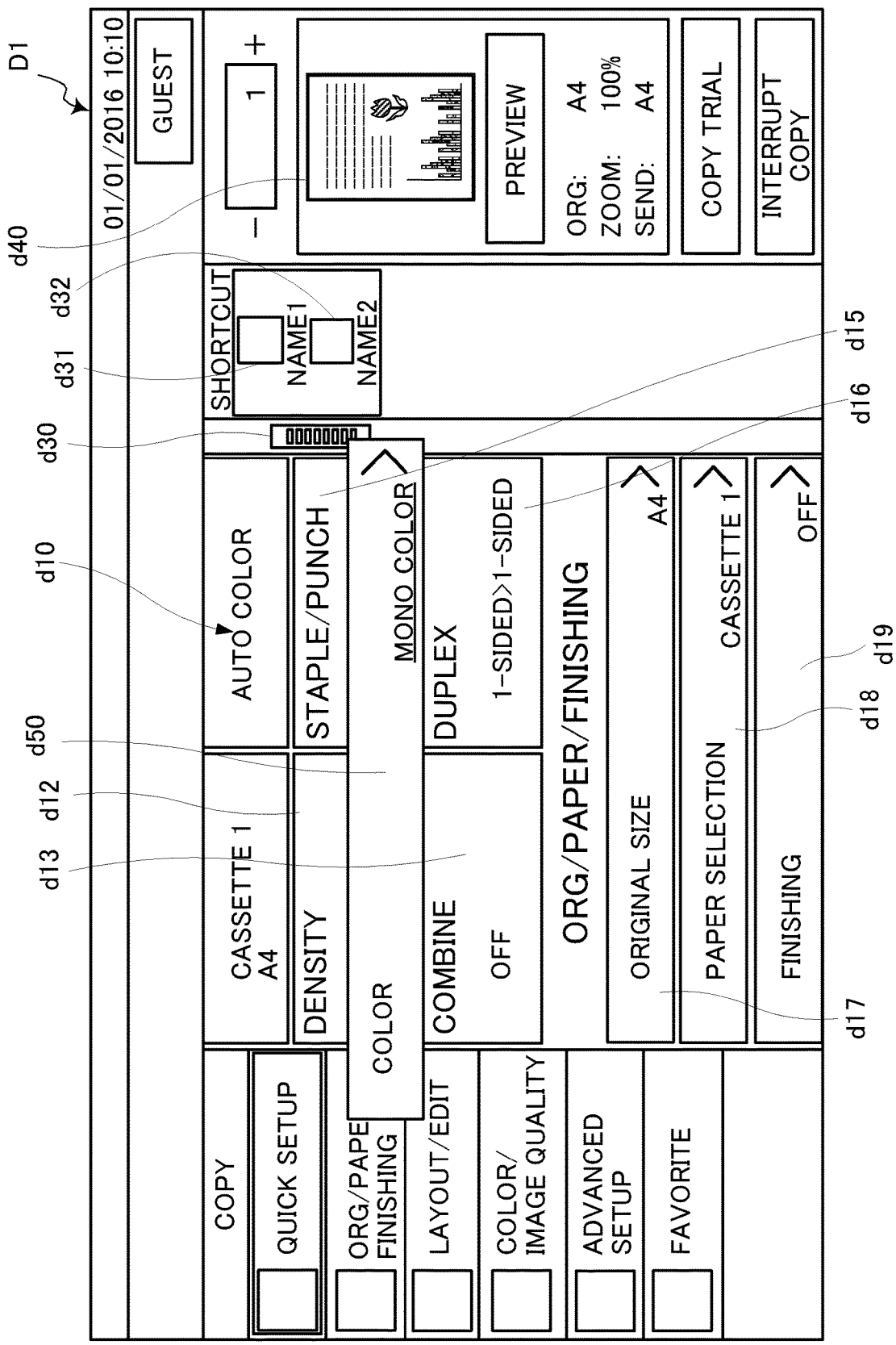

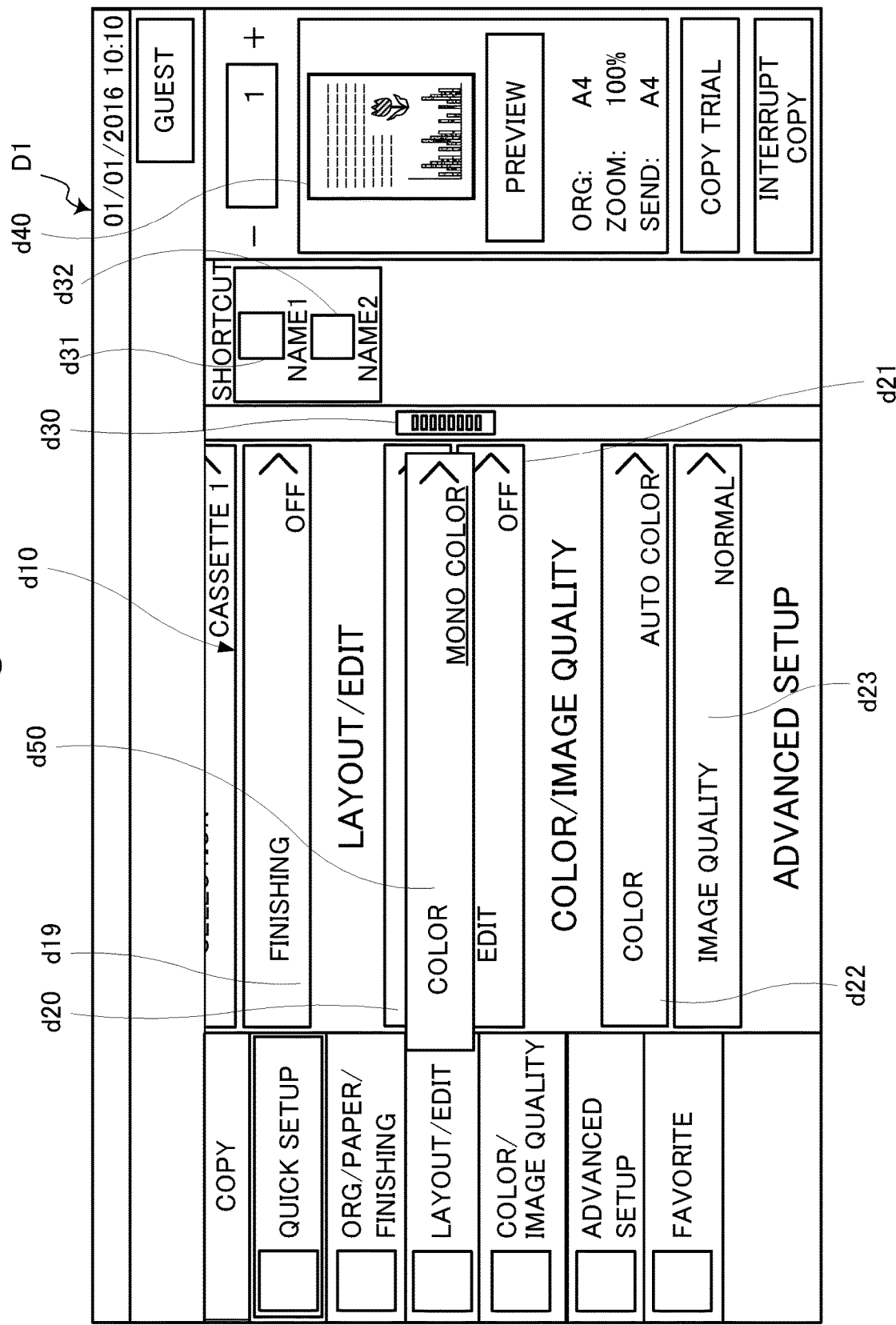

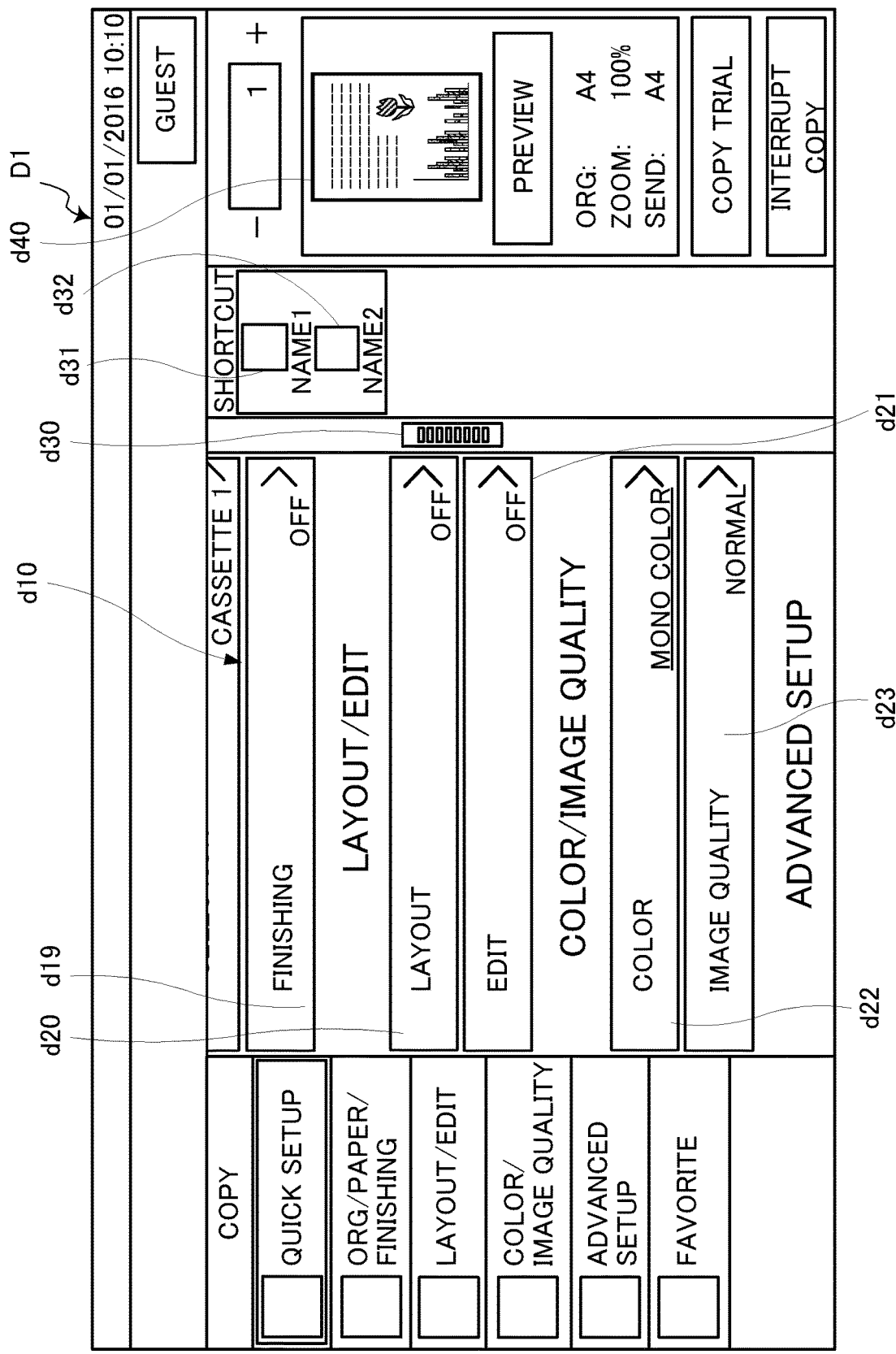

INFORMATION PROCESSING DEVICE, IMAGE FORMING APPARATUS, AND COMPUTER-READABLE NON-TRANSITORY RECORDING MEDIUM WITH INFORMATION PROCESSING PROGRAM STORED THEREON

INCORPORATION BY REFERENCE

This application claims priority to Japanese Patent Application No. 2017-087267 filed on 26 Apr. 2017, the entire contents of which are incorporated by reference herein.

BACKGROUND

The present disclosure relates to information processing devices, image forming apparatuses, and computer-readable non-transitory recording media with an information processing program stored thereon, and particularly to a technique for changing setting candidates of a plurality of respective setting items.

In recent years, along with advancement in equipment, image forming apparatuses, mobile devices such as smartphones, and personal computers, each of which having numbers of setting items, have been produced. The equipment of the kind is provided with a display section of, for example, a liquid crystal display (LCD) or an organic light-emitting diode (OLED), and the display section is controlled to display a setting screen including a setting item list on which a plurality of setting items are listed.

SUMMARY

A technique improved over the aforementioned technique is proposed as one aspect of the present disclosure.

An information processing device according to one aspect of the present disclosure includes a display section and a control unit. The display section displays a setting screen that receives change in a setting candidate of a plurality of respective setting items settable in the information processing device. The control unit includes a processor and, when the processor executes a control program, functions as: a display control section controlling display operation of the display section; a gesture receiving section receiving a user's gesture; and a setting candidate receiving section receiving, in accordance with the user's gesture received by the gesture receiving section, the change in the setting candidate of the respective setting items. The setting screen includes a scrolling display area where a predetermined scroll image is scroll-displayed in accordance with a scroll gesture received by the gesture receiving section and a shortcut button associated with a predetermined setting candidate of a predetermined setting item. On the scrolling display area, a setting item list composed of the plurality of setting items listed in a scrolling direction is displayed as the predetermined scroll image, and the setting item list shows, for each of the plurality of setting items, information representing the setting candidate currently set. When the gesture receiving section receives a selection gesture performed on the shortcut button, the display control section causes the display section to: (i) display, in the setting screen, a pop-up image showing the setting item and the setting candidate associated with the selected shortcut button; (ii) thereafter, scroll-display the setting item list displayed on the scrolling display area until the setting item associated with the selected shortcut button is displayed in the setting screen; and (iii) move the pop-up image to a position where the setting item which is in the setting item list and associated with the selected shortcut button is displayed, and display, as the information representing the setting candidate currently set in the setting item list, the setting candidate associated with the shortcut button. The setting candidate receiving section receives, when the gesture receiving section receives the selection gesture performed on the shortcut button, the change to the setting candidate associated with the selected shortcut button.

An image forming apparatus according to another aspect of the present disclosure includes an image forming section and the above-described information processing device. The image forming section forms an image on a recording sheet. The display section displays a setting screen that receives change in a setting candidate of a plurality of respective setting items related to an image formation by the image forming section. The setting candidate receiving section receives, in accordance with the user's gesture received by the gesture receiving section, the change in the setting candidate of the respective setting items related to the image formation by the image forming section. The image forming section executes image forming operation based on the setting candidate of the setting item that the setting candidate receiving section has received.

In a computer-readable non-transitory recording medium with an information processing program stored thereon according to still another aspect of the present disclosure, when the processor executes the information processing program, the information processing program causes a computer including a processor to function as a display control section, a gesture receiving section, and a setting candidate receiving section. The display control section controls display operation of a display section, the display section displaying a setting screen that receives change in a setting candidate of a plurality of respective settable setting items. The gesture receiving section receives a user's gesture. The setting candidate receiving section receives, in accordance with the user's gesture received by the gesture receiving section, the change in the setting candidate of the respective setting items. The information processing program further causes the computer to function so that: the setting screen includes a scrolling display area where a predetermined scroll image is scroll-displayed in accordance with a scroll gesture received by the gesture receiving section and a shortcut button associated with a predetermined setting candidate of a predetermined setting item; on the scrolling display area, a setting item list composed of the plurality of setting items listed in a scrolling direction is displayed as the predetermined scroll image, and the setting item list shows, for each of the plurality of setting items, information representing the setting candidate currently set; and when the gesture receiving section receives a selection gesture performed on the shortcut button, the display control section causes the display section to: (i) display, in the setting screen, a pop-up image showing the setting item and the setting candidate associated with the selected shortcut button; (ii) thereafter, scroll-display the setting item list displayed on the scrolling display area until the setting item associated with the selected shortcut button is displayed in the setting screen; and (iii) move the pop-up image to a position where the setting item which is in the setting item list and associated with the selected shortcut button is displayed, and display, as the information representing the setting candidate currently set in the setting item list, the setting candidate associated with the shortcut button. The information processing program further causes the computer to function so that the setting candidate receiving section receives, when the gesture receiving section receives the selection gesture performed on the shortcut button, the change to the setting candidate associated with the selected shortcut button.

BRIEF DESCRIPTION OF THE DRAWINGS

FIG. 8A and FIG. 8B are diagrams each showing an example of the screen displayed on the display section of the image forming apparatus according to the one embodiment of the present disclosure.

FIG. 9A and FIG. 9B are diagrams each showing an example of the screen displayed on the display section of the image forming apparatus according to the one embodiment of the present disclosure.

DETAILED DESCRIPTION

Hereinafter, a description will be given, with reference to the drawings, on an information processing device, an image forming apparatus, and an information processing program according to one embodiment of the present disclosure.

Figure 1:
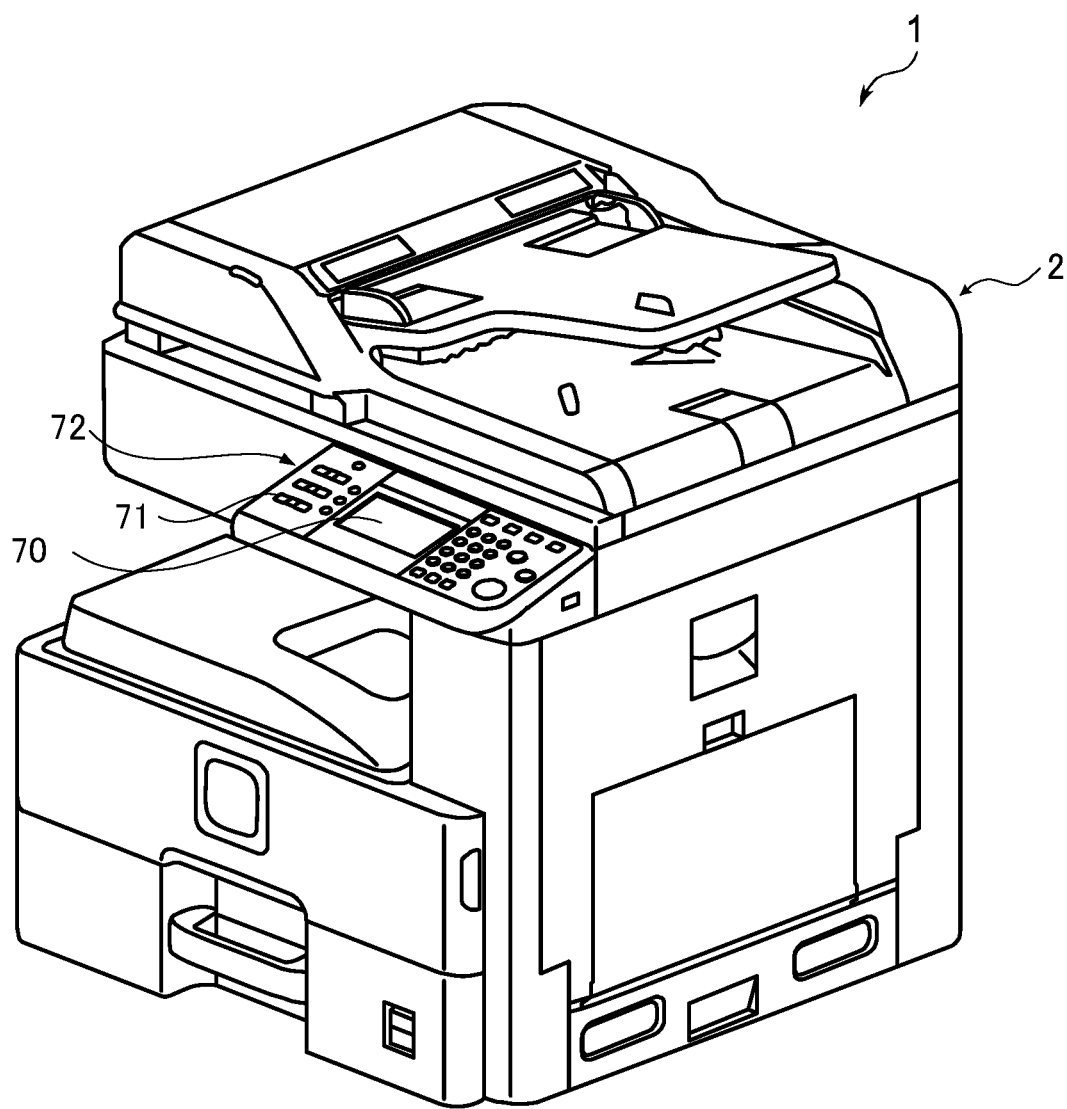
FIG. 1 is a perspective view showing the appearance of an image forming apparatus provided with an image processing device according to one embodiment of the present disclosure.
Figure 2:
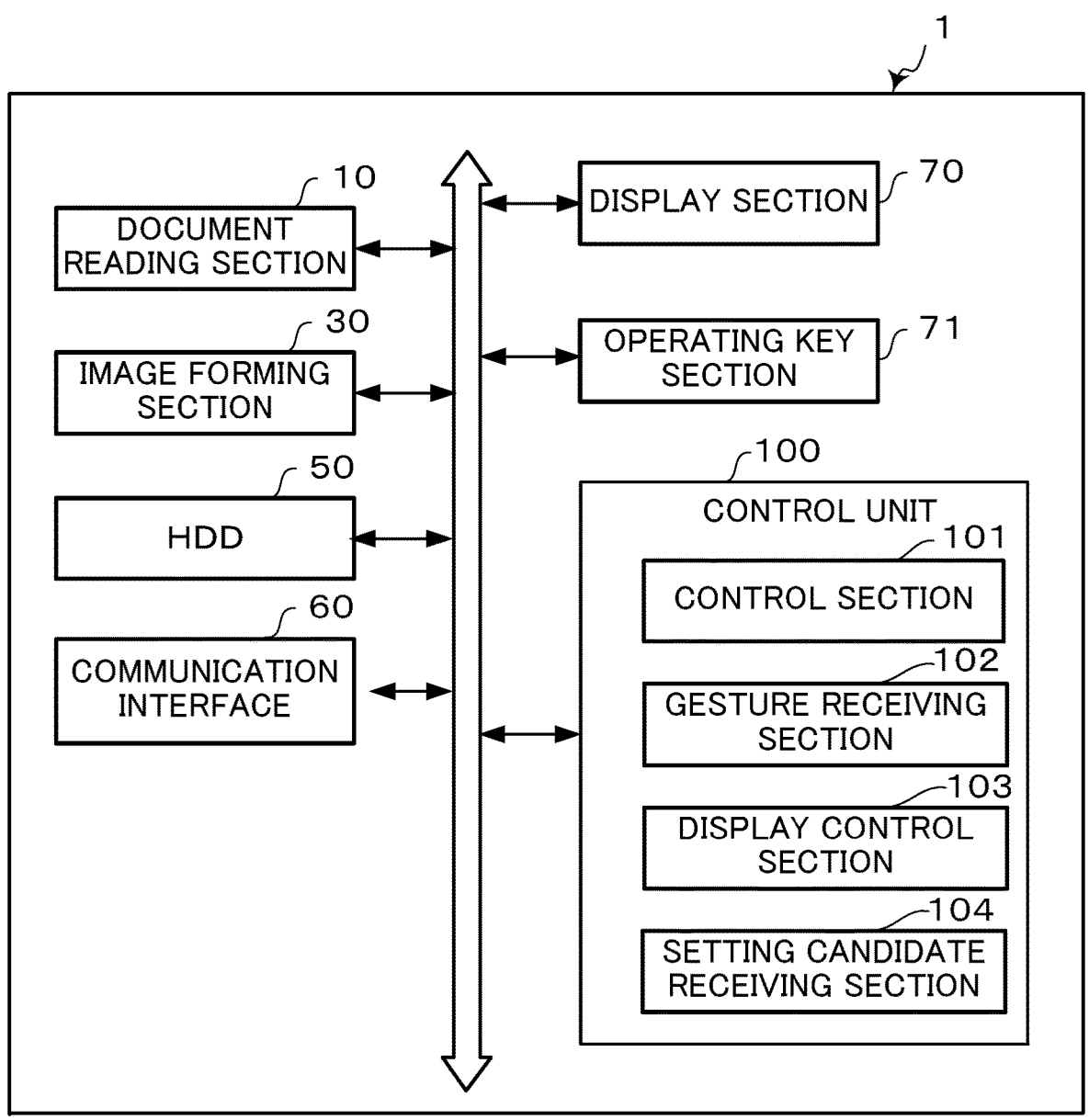
FIG. 2 is a functional block diagram showing an essential part of an internal configuration of the image forming apparatus provided with the image processing device according to the one embodiment of the present disclosure.

FIG. 1 is a perspective view showing the appearance of the image forming apparatus provided with the image processing device according to the one embodiment of the present disclosure. FIG. 2 is a functional block diagram showing an essential part of an internal configuration of the image forming apparatus provided with the image processing device according to the one embodiment of the present disclosure.

An image forming apparatus 1 is a multifunction peripheral having a plurality of functions, such as copying, printing, scanning, and facsimile transmission. As illustrated in FIG. 1, the image forming apparatus 1 includes a document reading section 10, an image forming section 30, and so on provided inside an apparatus body 2. The document reading section 10 optically reads an original document placed on an un-illustrated contact glass and forms image data. The image forming section 30 forms an image on a recording sheet by, for example, an electrophotographic system and an ink jet system.

An operation panel 72, which includes a display section 70 and an operating key section 71, is arranged in front of the apparatus body 2.

The display section 70 is formed of a liquid crystal display, an organic light-emitting diode display or the like. The display section 70 displays an operation screen for inputting instructions such as a document reading instruction and an image formation instruction, and a setting screen for performing various kinds of settings.

The operating key section 71 includes, for example, a start key for calling up the operation screen and the setting screen, arrow keys for moving the focus of a GUI forming the operation screen and the setting screen, a determination key for performing a determination operation for the GUI forming the operation screen and the setting screen, and a numeric keypad. The operating key section 71 receives input of a user's gesture performed on the operation screen and the setting screen displayed on the display section 70.

A touch panel of, for example, a so-called resistive film system or a capacitance system may be disposed in front of the display section 70. In that case, the input of the user's gesture performed on the operation screen and the setting screen displayed on the display section 70 is received by a touch gesture performed on the touch panel.

The image forming apparatus 1 includes, in addition to the aforesaid document reading section 10 and image forming section 30, an HDD 50, a communication interface 60, a control unit 100, and so on.

The HDD 50 is a large-capacity storage device, and stores the image data read by the document reading section 10 and a setting candidate received by a setting candidate receiving section 104 (to be described later on) of the control unit 100.

The communication interface 60 includes a communication module such as a LAN chip, and performs data communication among other image forming apparatuses and personal computers and so on connected over a network.

The control unit 100 includes a processor, a random access memory (RAM), a read only memory (ROM), and an exclusive hardware circuit. The processor is, for example, a central processing unit (CPU), a field programmable gate array (FPGA), or an application specific integrated circuit (ASIC). The control unit 100 functions as a control section 101, a gesture receiving section 102, a display control section 103, and the setting candidate receiving section 104 when the processor operates in accordance with a program such as an information processing program stored on the HDD 50. Alternatively, each of the above-mentioned sections may not be implemented by the operation of the control unit 10 in accordance with the program but may be constituted by a hardware circuit.

The control section 101 governs the overall operation control of the image forming apparatus 1. For example, on the basis of each setting candidate stored on the HDD 50, the control section 101 controls the image forming section 30 and forms an image desired by the user on the recording sheet.

On the basis of a signal output from the operating key section 71 or the touch panel disposed in front of the display section 70, the gesture receiving section 102 determines the user's gesture inputted by the user. The gesture receiving section 102 then receives the determined user's gesture and outputs a control signal corresponding to the user's gesture to the display control section 103 and the setting candidate receiving section 104.

The display control section 103 has a function of controlling display operation of the display section 70 in accordance with the user's gesture received by the gesture receiving section 102.

The setting candidate receiving section 104 has a function of receiving, in accordance with the user's gesture received by the gesture receiving section 102, change in a setting candidate of a plurality of respective setting items that can be set at the image forming apparatus 1.

Figure 3:
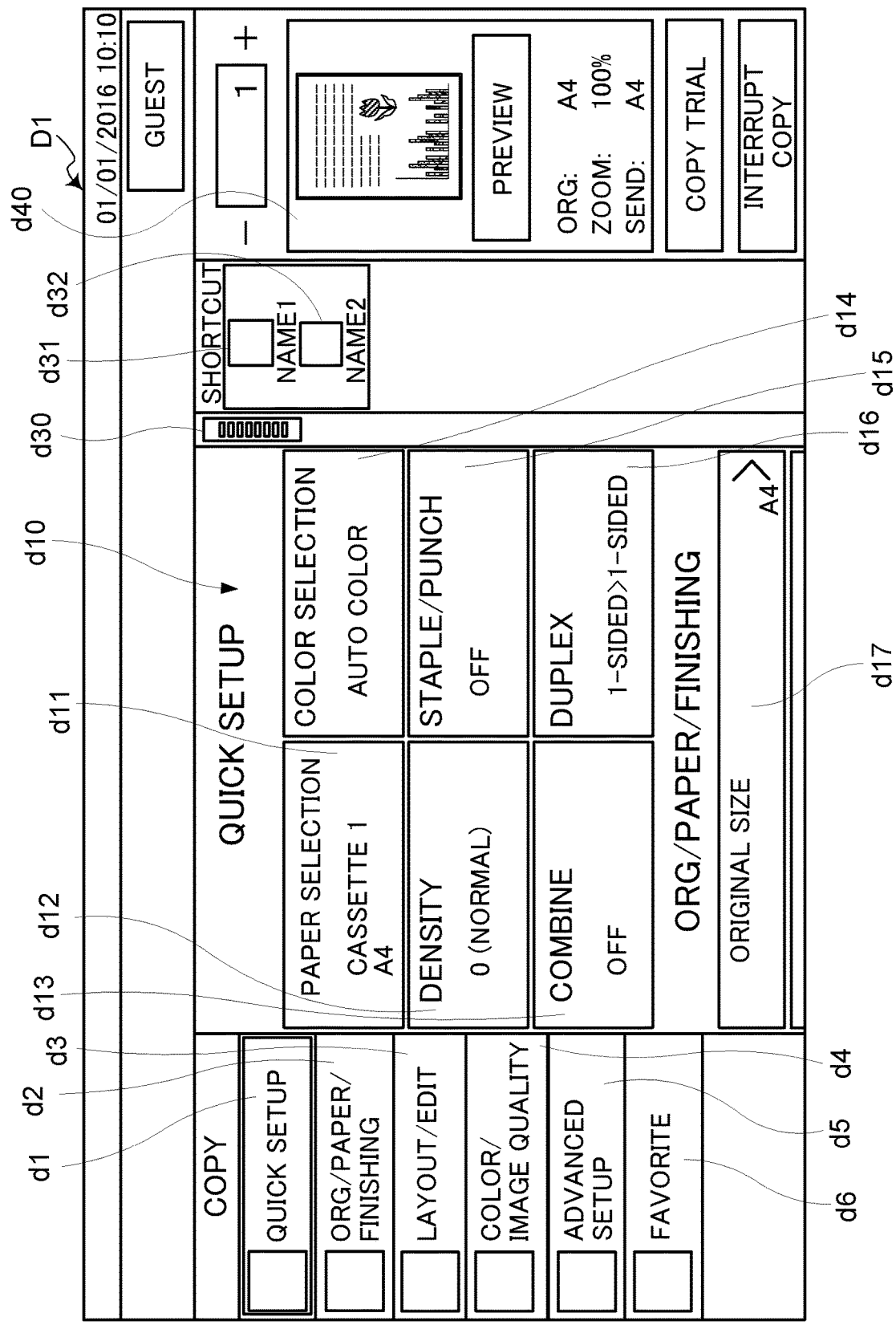
FIG. 3 is a diagram showing an example of a screen displayed on a display section of the image forming apparatus according to the one embodiment of the present disclosure.

FIG. 3 is a diagram showing an example of a screen displayed on the display section 70 under the control of the display control section 103. The example illustrated in FIG. 3 shows a setting screen D1 that is used for performing the settings in executing processing of reading the document to generate the image data and forming, onto the recording sheet, the image based on the generated image data (in other words copy processing).

The setting screen D1 includes the scrolling display area d10 where a predetermined scroll image is scroll-displayed under the control of the display control section 103 in accordance with the scroll gesture that the gesture receiving section 102 has received. A setting item list is displayed on the scrolling display area d10 as the predetermined scroll image. The setting item list is composed of the plurality of setting items listed in a scrolling direction (a vertical direction in the drawing), the setting items being settable in executing the copy processing.

Figure 4:
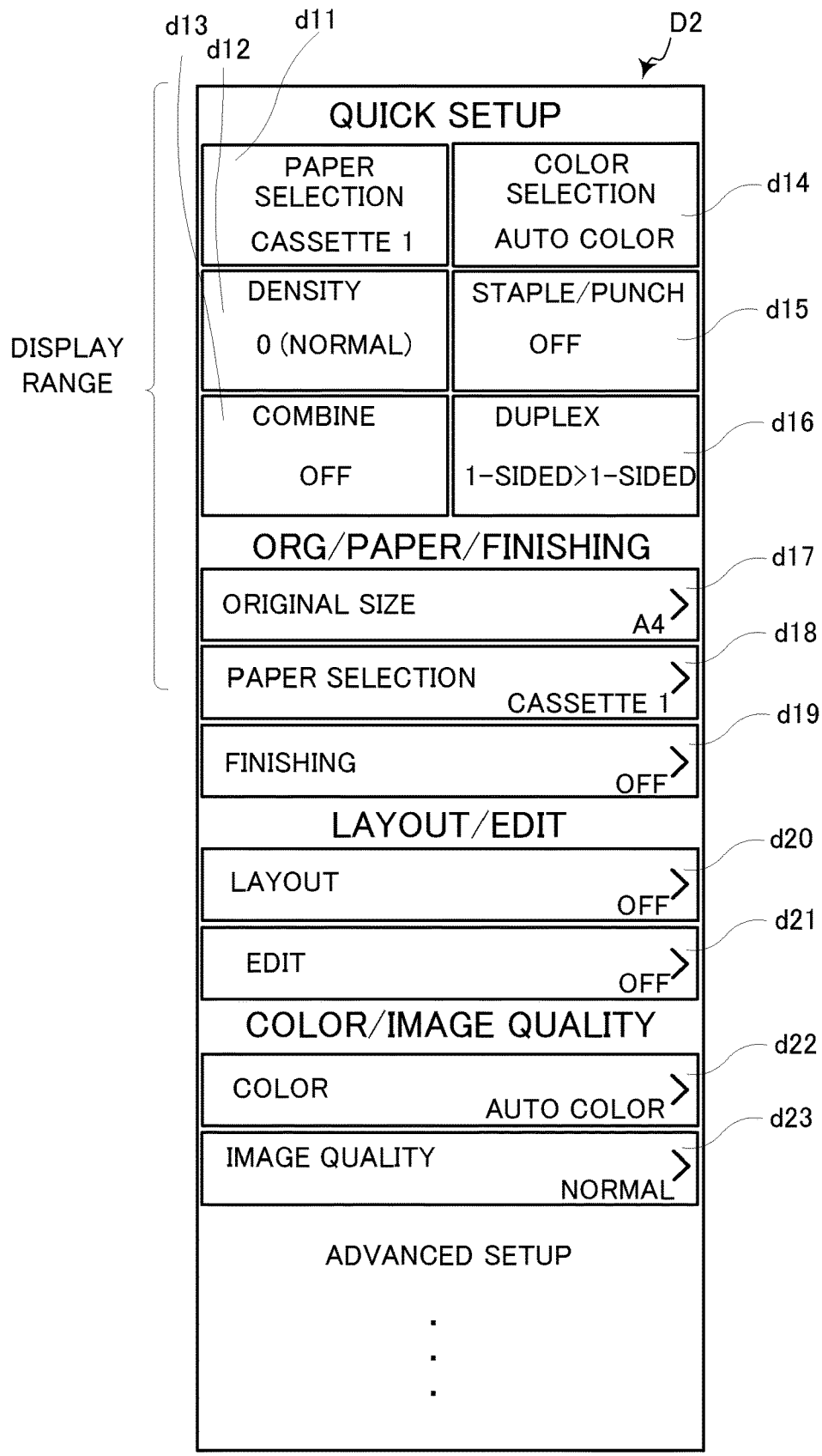
FIG. 4 is a diagram showing an example of a setting item list displayed on a scrolling display area of a setting screen being displayed on the display section of the image forming apparatus according to the one embodiment of the present disclosure.

FIG. 4 is a diagram showing an example of the setting item list displayed on the scrolling display area d10. A setting item list D2 illustrated in FIG. 4 includes images d11 to d23 each indicating the setting item settable in executing the copy processing. Additionally, information representing the setting candidate currently set (default setting candidate) for each of the plurality of setting items is shown in the setting item list D2. For example, the image d18 indicates that "CASSETTE 1" is being set as the default setting candidate of the setting item "PAPER SELECTION" that is for setting a paper feed cassette to feed the recording sheet. In addition, the image d22 indicates that "AUTO COLOR" is being set as the default setting candidate of the setting item "COLOR" that is for setting a color when an image is formed on the recording sheet.

Figure 5:
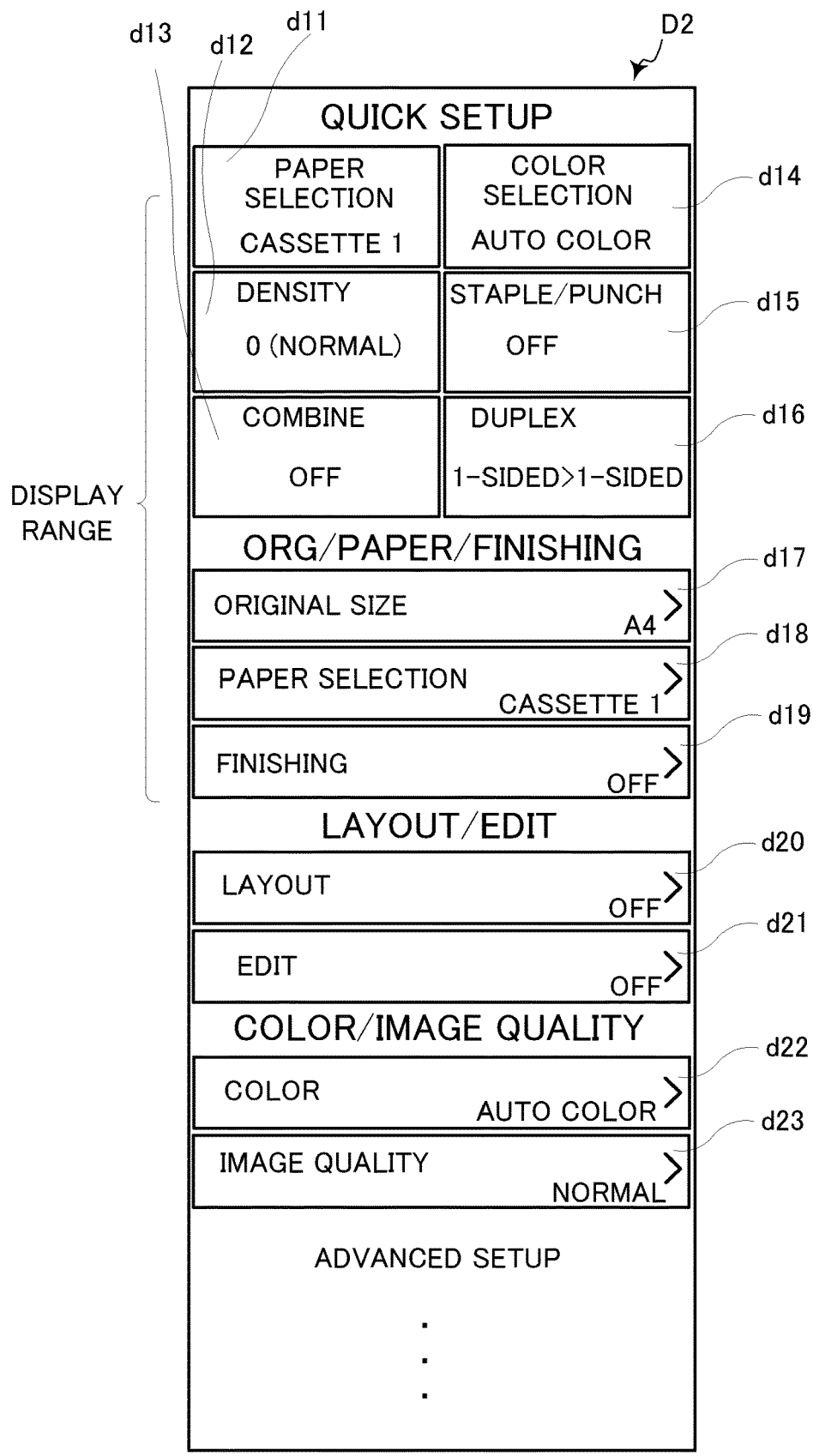
FIG. 5 is a diagram showing an example of the setting item list displayed on the scrolling display area of the setting screen being displayed on the display section of the image forming apparatus according to the one embodiment of the present disclosure.

The full range of the setting item list D2 cannot be displayed at the scrolling display area d10 at one time because the size of the display section 70 is limited. As illustrated in FIG. 4, because of this reason, the display control section 103 causes the display section 70 to display, in the scrolling display area d10, a part of the range of the setting item list D2 (display range shown in the drawing) as a display screen, and when the gesture receiving section 102 receives a scroll gesture from the user, the display control section 103 causes the display section 70 to scroll display the display screen displayed on the scrolling display area d10. For example, when the gesture receiving section 102 receives a scroll gesture to move the screen downward from the user, the display range of the setting item list D2 is changed into the state illustrated in FIG. 5.

When the gesture receiving section 102 receives a selection gesture performed on one setting item out of the setting items displayed on the scrolling display area d10, the setting candidate receiving section 104 changes the setting candidate of the selected one setting item. For example, when the gesture receiving section 102 receives the selection gesture (press-down gesture) on the image d18 indicating the setting item "PAPER SELECTION", the setting candidate receiving section 104 changes the setting candidate of the setting item "PAPER SELECTION". Specifically, every time the gesture receiving section 102 receives the selection gesture performed on the image d18, the setting candidate receiving section 104 changes the setting candidate one by one from "CASSETTE 1" to "CASSETTE 2" to "CASSETTE 3" then to "CASSETTE 1". When the change is made on the setting candidate, the setting candidate receiving section 104 causes the HDD 50 to store the changed setting candidate.

As described thus far, the user inputs a scroll gesture in a vertical direction through the operating key section 71 and the touch panel disposed in front of the display section 70. This input allows a desired setting item out of the plurality of setting items settable in executing the copy processing to be displayed on the scrolling display area d10, and the user can change the setting candidate of the setting item.

Referring back to FIG. 3, in addition to the aforementioned scrolling display area d10, the setting screen D1 includes a scrolling bar d30 used for the scroll gesture, and a preview imaging area d40 on which a preview image showing an image to be formed on the recording sheet. In addition, buttons d1 to d6 used for changing the display range of the setting item list D2 to a predetermined range associated with each of the buttons are also arranged on the setting screen D1. For example, when the gesture receiving section 102 receives the selection gesture performed on the button d4 arranged on the setting screen D1, the display control section 103 changes the display range of the setting item list D2 to the range covering the setting item "COLOR" and the setting item "IMAGE QUALITY".

Additionally, shortcut buttons d31 and d32 are arranged on the setting screen D1. Each of the shortcut buttons d31 and d32 is associated with a predetermined setting candidate of a predetermined setting item among the plurality of setting items listed in the setting item list D2. When the gesture receiving section 102 receives the selection gesture performed on the shortcut buttons d31 and d32, the setting candidate receiving section 104 performs a processing of changing the setting candidate of the setting item associated with the selected shortcut button to the aforesaid predetermined setting candidate.

Figure 6:
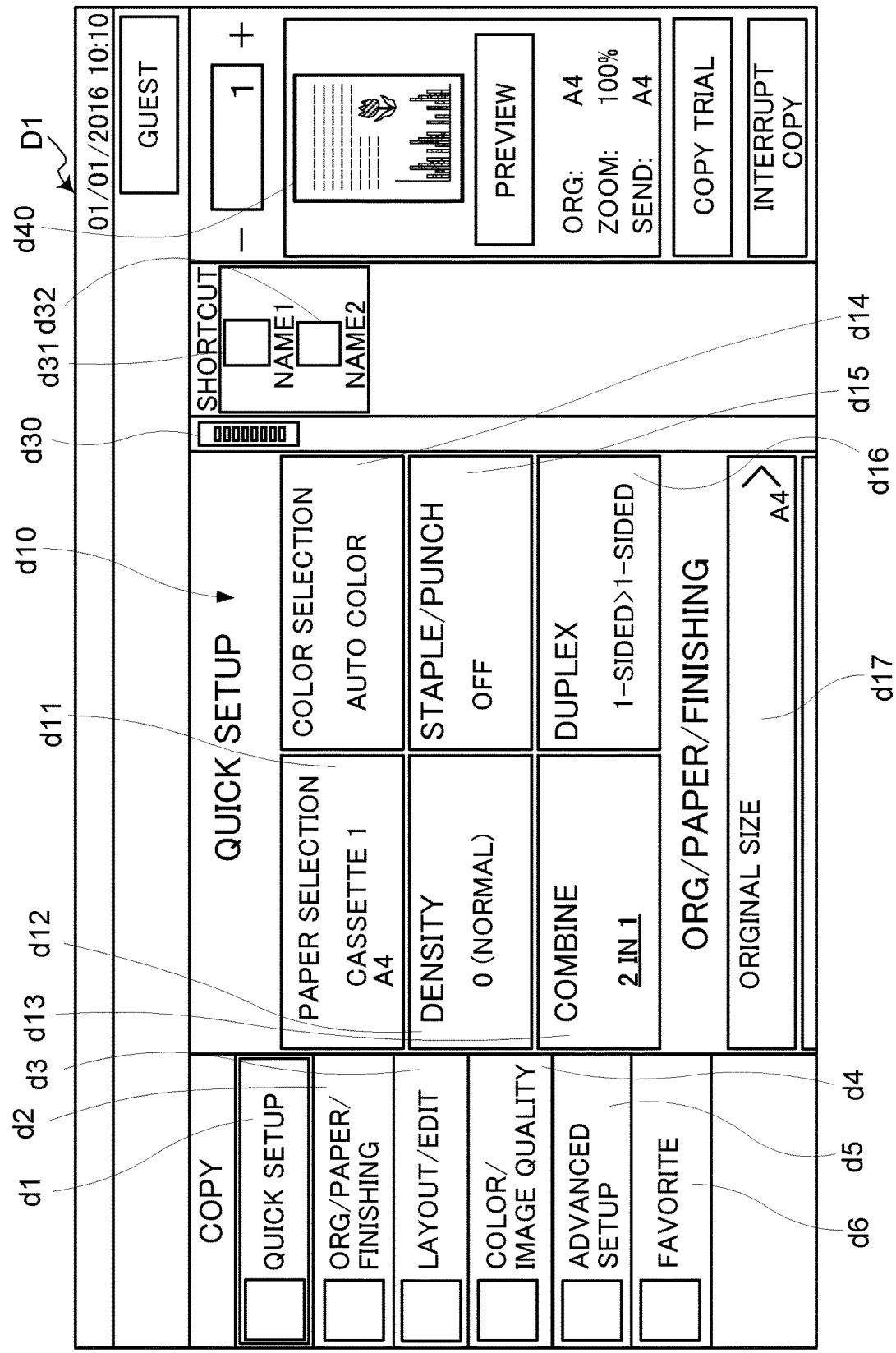
FIG. 6 is a diagram showing an example of the screen displayed on the display section of the image forming apparatus according to the one embodiment of the present disclosure.

In the case where the change in the setting candidate is made through the shortcut buttons d31 and d32, a general image forming apparatus notifies a user that the setting candidate has been changed by the way in which the setting screen D1 is changed from a state illustrated in FIG. 3 to a state illustrated in FIG. 6. In the examples illustrated in the drawings, the setting candidate of the setting item "COMBINE" is changed from "OFF" to "2 IN 1". In the state illustrated in FIG. 6, the setting candidate of "2 IN 1" is displayed on the display section 70 in a display manner different from the setting candidate of "OFF" which is before the change is made (illustrated in FIG. 3). Here, the above-referred "display in a display manner different from" means, for example, changing the thickness and color of characters and displaying.

However, in the display method of the general image forming apparatus, the user cannot know where in the setting item list D2 that the setting candidate of the setting item having been changed through the pressing down operation on the shortcut buttons d31 and d32 is located. Hence, in the case where the user changes, later on, the setting candidate of the setting item by scroll-displaying the setting item list D2 without using the shortcut button, while scrolling the setting item list up and down, it is necessary to perform operation to determine where in the setting item list the setting item that the user desires to change is located. This operation takes time and effort in changing the setting candidate.

Figure 7:
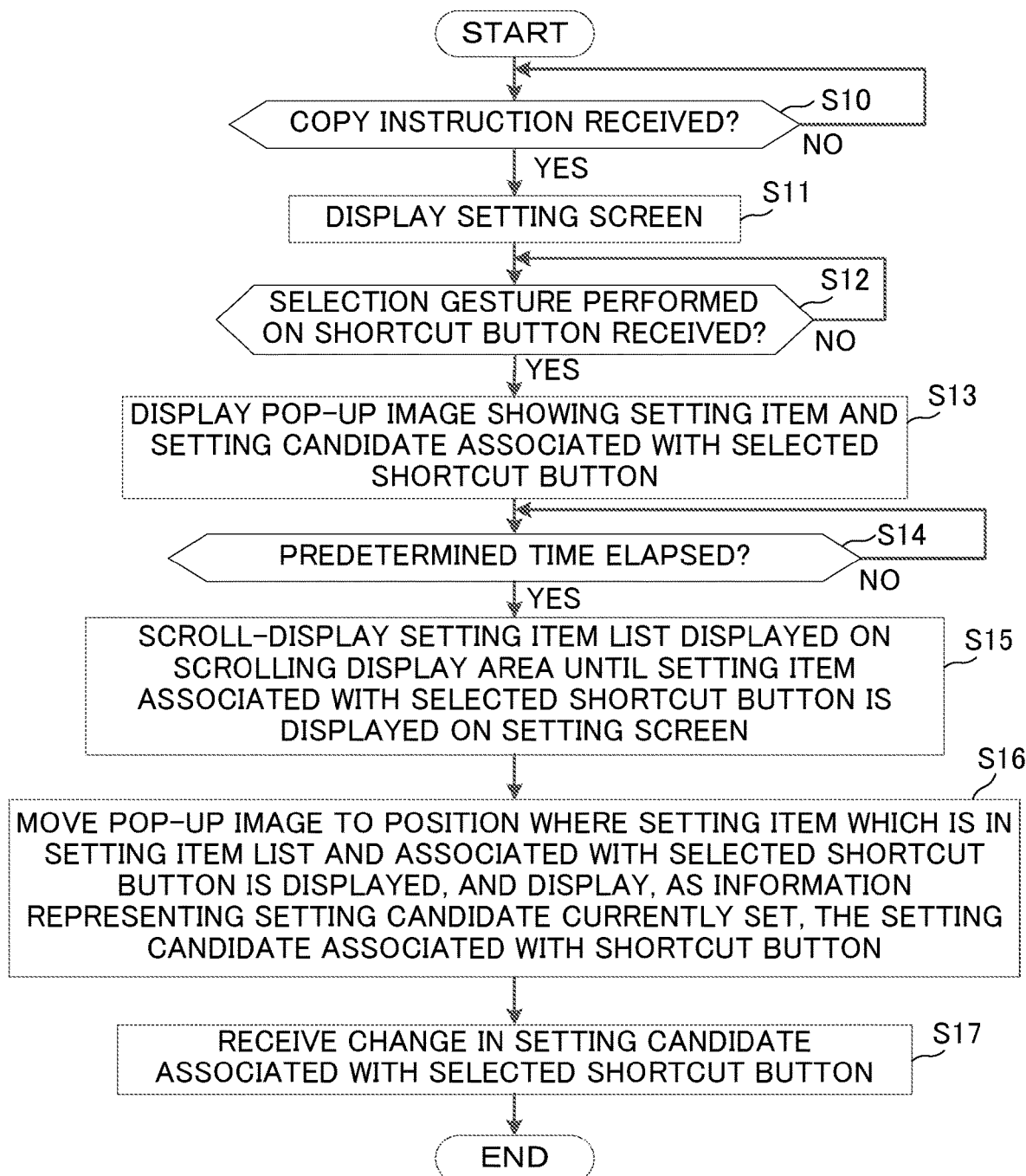
FIG. 7 is a flowchart showing an operation flow of the information processing device and the image forming apparatus according to the one embodiment of the present disclosure.

The present disclosure is to solve the problem described above by devising display methods of the setting screen D1. FIG. 7 is a flowchart showing an operation flow of an information processing device and the image forming apparatus 1 according to the one embodiment of the present disclosure. FIG. 7 illustrates the operation flow in changing the setting candidate of the setting item for the copy processing.

When a copy instruction is inputted through the operating key section 71 or the touch panel disposed in front of the display section 70, and the gesture receiving section 102 receives the copy instruction (YES in step S10), the display control section 103 causes the display section 70 to display the setting screen D1 illustrated in FIG. 3 (step S11).

Figure 8A:
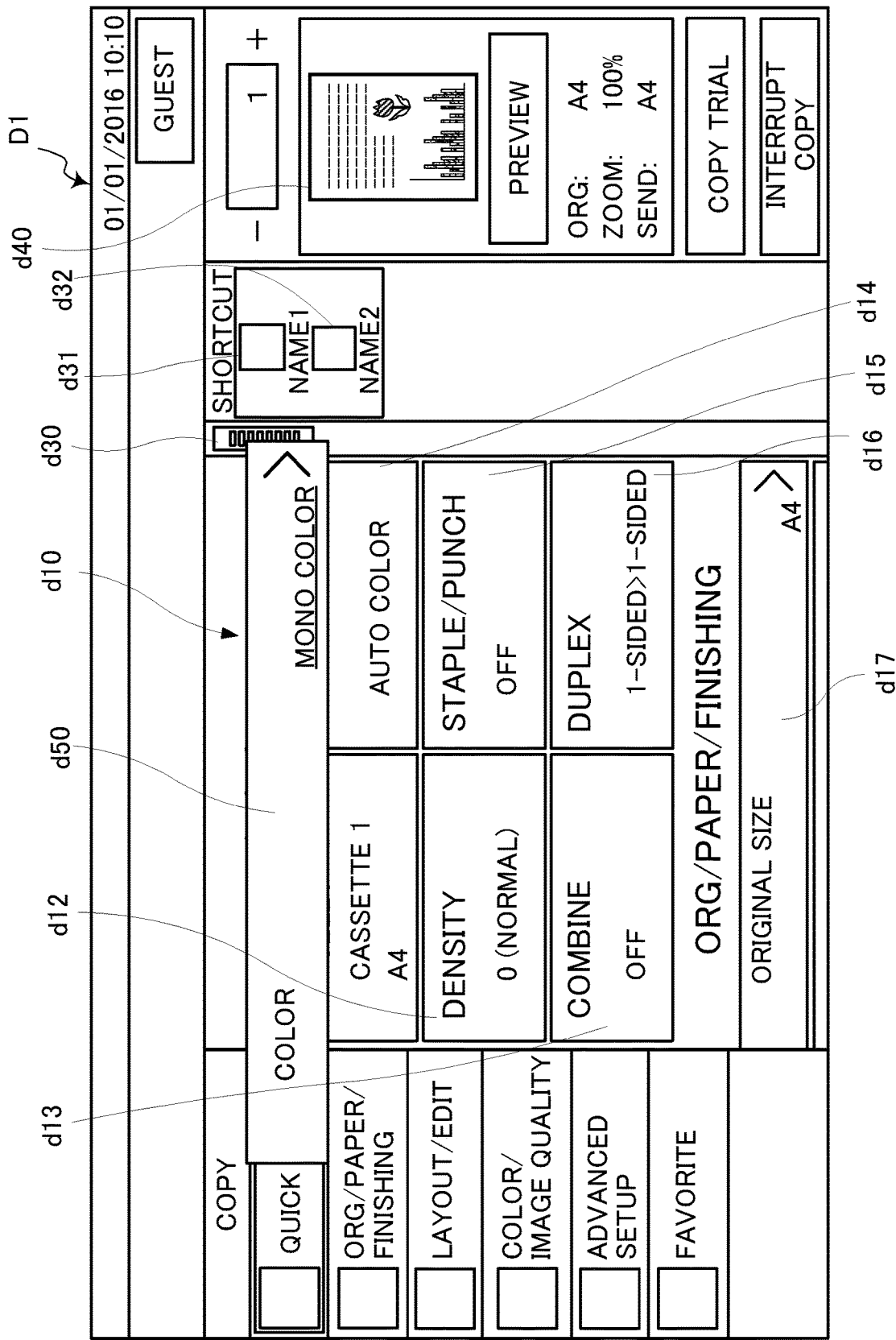

When the gesture receiving section 102 receives a selection gesture performed on the shortcut button d31 or d32 on the setting screen D1 (YES in step S12), the display control section 103 causes the display section 70 to display on the setting screen D1 a pop-up image d50 showing the setting item and the setting candidate associated with the selected shortcut button d31 or d32 as illustrated in FIG. 8A (step S13). FIG. 8A illustrates the case where the shortcut button d31 is selected and the shortcut button d31 associated with the setting item "COLOR" and the setting candidate "MONO COLOR" is shown in the pop-up image d50.

Referring back to FIG. 7, processing in step S14 is performed after the processing in step S13. Namely, the display control section 103 keeps the state of displaying the pop-up image d50 on the setting screen D1 until a predetermined time elapses.

When the predetermined time elapses after the execution of the processing of step S13 (YES in step S14), the display control section 103 causes the display section 70 to scroll-display the setting item list D2 displayed on the scrolling display area d10 until the setting item associated with the selected shortcut button is displayed on the setting screen D1 (step S15).

The display control section 103 moves the pop-up image d50 to a position where the setting item which is in the setting item list D2 and associated with the selected shortcut button is displayed, and performs processing of causing the display section 70 to display, as the information representing the setting candidate currently set, the setting candidate associated with the shortcut button (step S16).

The processing in the above-described step S15 and step S16 will be detailed with reference to FIG. 8B, FIG. 9A, and FIG. 9B.

First, as illustrated in FIG. 8B, the display control section 103 causes the display section 70 to scroll-display the setting item list D2 displayed on the scrolling display area d10 towards a position where the image d22 (not yet appeared in FIG. 8B), on which the setting item associated with the selected shortcut button d31 is shown, is located. Additionally, along with the processing of scroll-displaying the setting item list D2 to downward direction in the drawing, the display control section 103 performs a processing of moving the pop-up image d50 towards the position where the image d22, on which the setting item associated with the shortcut button d31 is shown, is located (i.e., the downward direction in the drawing).

By performing the processing described above, the state of the setting screen D1 becomes the state illustrated FIG. 9A from the state illustrated in FIG. 8B. The display control section 103 performs the processing of scroll-displaying the setting item list D2 to the downward direction in the drawing until the image d22, on which the setting item associated with the shortcut button d31 is shown, is displayed on the setting screen D1. Then, the display control section 103 moves (or superposes) the pop-up image d50 to the position where the image d22 in the setting item list D2 is displayed. The display control section 103 also causes the display section 70 to display, within the image d22, the setting candidate "MONO COLOR" associated with the shortcut button d31 as the information representing the set setting candidate currently set. The setting screen D1 becomes the state illustrated in FIG. 9B from the state illustrated in FIG. 9A as a result of the above processing.

In the processing in step S16, in the case where the display control section 103 causes the display section 70 to display the setting candidate associated with the shortcut button as the information representing the setting candidate currently set, the display control section 103 causes the display section 70 to display the setting candidate associated with the shortcut button in a display manner different from other setting candidates in the setting item list D2. To be specific, by changing the thickness and color of characters (for example, at least either one of the thickness and color of characters), the display control section 103 changes the display manner of the setting candidate associated with the shortcut button to be different from the display manner of other setting candidates.

Referring back to FIG. 7, the setting candidate receiving section 104 performs the processing of receiving the change in the setting candidate associated with the shortcut button having been selected in the processing in step S12 (step S17). The setting candidate receiving section 104 causes the HDD 50 to store the changed setting candidate.

As described above, because a display section has a limit in size in a general device including a plurality of setting items, sometimes a setting item list composed of the plurality of listed setting items cannot be displayed entirely at once. In such case, only a part of the setting item list is firstly displayed, and by scroll-displaying the setting item list upon receiving a scroll gesture from a user, the setting item list can be viewed entirely by the user.

Furthermore, in some cases, the setting screen is provided with a shortcut button associated with a predetermined setting candidate of a predetermined setting item. When the shortcut button is pressed, a general device performs a processing of changing a setting candidate of a setting item into a setting candidate associated with the shortcut button.

However, in the processing described above, the user cannot know the location in the setting item list about the setting candidate of the setting item that has been changed by pressing down the shortcut button. Hence, in the case where the user changes, later on, the setting candidate of the setting item by scroll-displaying the setting item list without using the shortcut button, while scrolling the setting item list up and down, it is necessary to perform operation to determine where in the setting item list the setting item that the user desires to change is located. This operation takes time and effort in changing the setting candidate.

In contrast, even in the case of changing the setting candidate of the setting item through the pressing the shortcut button, the above-described information processing device, image forming apparatus, and information processing program according to the present embodiment can notify the user of where in the setting item list D2 the setting item having been changed through the pressing the shortcut button is located.

The present disclosure is not limited to the configuration of the above embodiment and can be modified in various ways.

Figure 10:
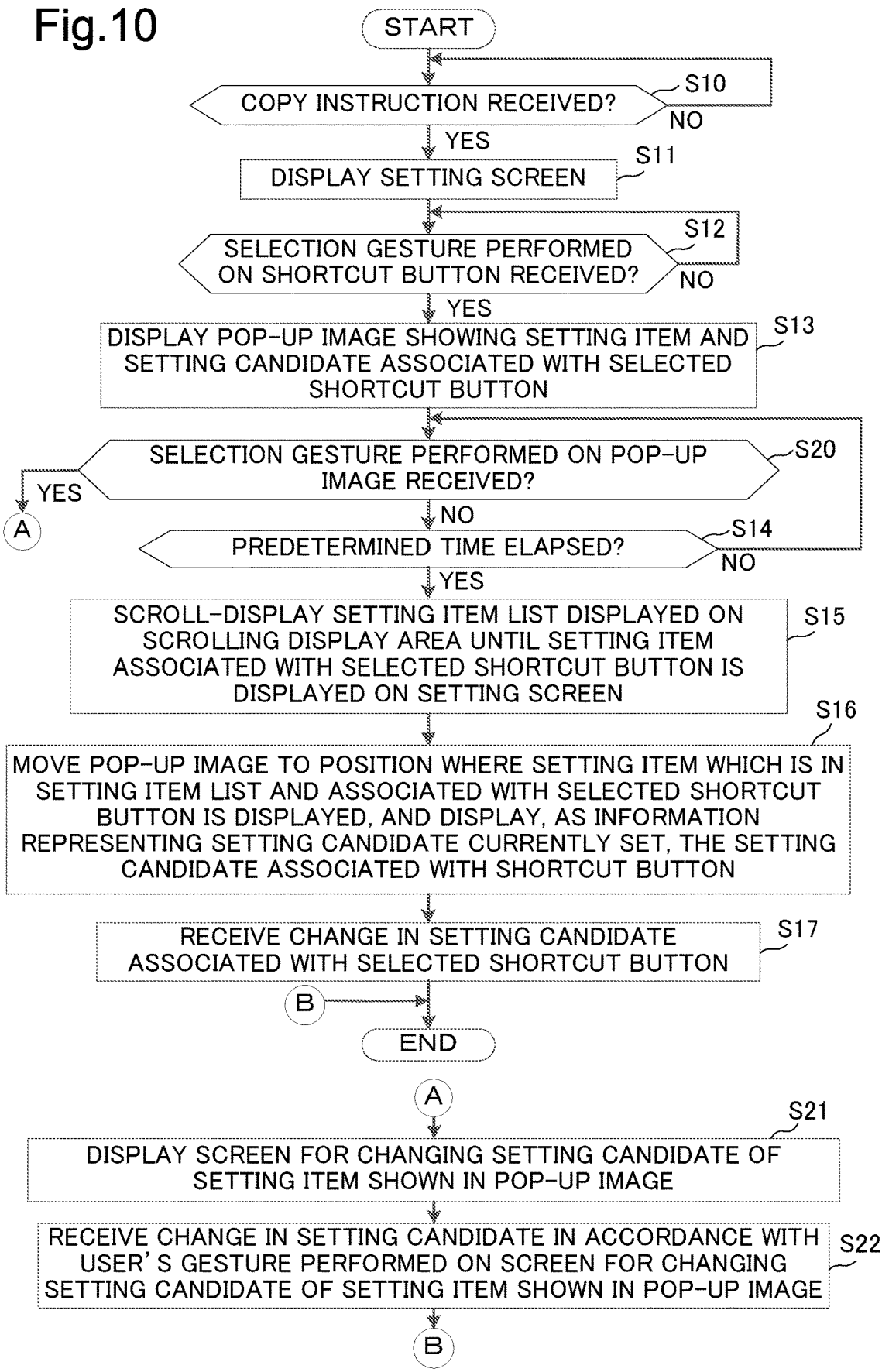
FIG. 10 is a flowchart showing an operation flow of the information processing device and the image forming apparatus of a modification of the present disclosure.

FIG. 10 is a flowchart showing an operation flow of the information processing device and the image forming apparatus 1 of a modification. The same pieces of processing as those in the flowchart of FIG. 7 are designated by the same reference numbers and further explanation thereof will be omitted.

In the case where the gesture receiving section 102 receives a selection gesture performed on the pop-up image d50 displayed on the setting screen D1 before the predetermined time elapses after the execution of the processing of step S13 (YES in step S20), the display control section 103 causes the display section 70 to display the screen for changing the setting candidate of the setting item shown in the pop-up image d50 (step S21). For example, under the state illustrated in FIG. 8A, when the selection gesture is performed on the pop-up image d50, the display control section 103 causes the display section 70 to display a screen for changing the setting candidate of the setting item "COLOR". Then, the setting candidate receiving section 104 receives the change in the setting candidate in accordance with the user's gesture performed on the screen having been displayed in step S21 (step S22).

By performing the processing described above, even after having performed the gesture of selecting the shortcut button, the user can change the setting candidate into setting candidates other than the setting candidate associated with the shortcut button.

The information processing program detailed in the above embodiment may be stored in a computer-readable non-transitory recording medium such as a hard disc, a CD-ROM, a DVD-ROM, and a semiconductor memory.

Although in the above embodiment the image forming apparatus has been taken as an example of the device on which the information processing device according to the present embodiment is provided, the present disclosure is not necessarily limited to this. The information processing device applicable as one embodiment of the present disclosure may be, besides the image forming apparatus, for example, a mobile terminal such as a tablet terminal or a smartphone, a personal computer or a television set.

While the present disclosure has been described in detail with reference to the embodiments thereof, it would be apparent to those skilled in the art the various changes and modifications may be made therein within the scope defined by the appended claims.

What is claimed is:

1. An information processing device comprising:
a display section displaying a setting screen that receives change in a setting candidate of a plurality of respective setting items settable in the information processing device; and
a control unit including a processor and, when the processor executes a control program, functions as:
a display control section controlling display operation of the display section;
a gesture receiving section receiving a user's gesture; and
a setting candidate receiving section receiving, in accordance with the user's gesture received by the gesture receiving section, the change in the setting candidate of the respective setting items,
wherein the setting screen includes a scrolling display area where a predetermined scroll image is scroll-displayed in accordance with a scroll gesture received by the gesture receiving section and a shortcut button to be displayed at a position different from the scrolling display area and associated with a predetermined setting candidate of a predetermined setting item,
on the scrolling display area, a part of a setting item list composed of images listed in a scrolling direction is displayed as the predetermined scroll image, each of the images indicating a respective name of the plurality of setting items, and the setting candidate currently set is shown on each of the images indicating the respective name of the plurality of setting items,
when the gesture receiving section receives a selection gesture performed on the shortcut button, the display control section causes the display section to:
(i) display, in the setting screen, a pop-up image showing the name of the setting item and the setting candidate associated with the selected shortcut button;
(ii-i) after a predetermined time elapses from the display of the pop-up image without the gesture receiving section receiving a selection gesture performed on the pop-up image, scroll-display the setting item list displayed on the scrolling display area until an image indicating a name of the setting item associated with the selected shortcut button is displayed on the scrolling display area;
(ii-ii) move the pop-up image to a position where the image indicating the name of the setting item which is in the setting item list and associated with the selected shortcut button is displayed, and change the setting candidate currently set in the image indicating the name of the setting item associated with the selected shortcut button to the setting candidate associated with the shortcut button; and
(iii) when the gesture receiving section receives the selection gesture before the predetermined time elapses from the display of the pop-up image, display a screen for changing the setting candidate of the setting item shown in the pop-up image, and the setting candidate receiving section receives;
when the gesture receiving section receives the selection gesture performed on the shortcut button and the processes of (ii-i) and (ii-ii) are executed, the change to the setting candidate associated with the selected shortcut button; and
when the gesture receiving section receives the selection gesture performed on the shortcut button and the process of (iii) is executed, the change in the setting candidate in accordance with the user's gesture performed on the screen for changing the setting candidate of the setting item shown in the pop-up image.

2. The information processing device according to claim 1, wherein
in the process of (ii-ii), when the display control section causes the display section to display, as the information representing the setting candidate currently set in the setting item list, the setting candidate associated with the shortcut button, the display control section causes the display section to display the setting candidate associated with the shortcut button in a display manner different from other setting candidates in the setting item list.

3. The information processing device according to claim 2, wherein
by changing at least one of thickness of characters and color of characters, the display control section causes the display section to display the setting candidate associated with the shortcut button in a display manner different from other setting candidates in the setting item list.

4. The information processing device according to claim 1, wherein
the setting screen further includes a button for changing a display range of the setting item list to a predetermined range, and
when the gesture receiving section receives the selection gesture performed on the button, the display control section changes the display range of the setting item list to the predetermined range pre-associated with the button.

5. An image forming apparatus comprising:
an image forming section forming an image on a recording sheet; and
the information processing device according to claim 1, wherein the display section displays a setting screen that receives change in a setting candidate of a plurality of respective setting items related to an image formation by the image forming section,
the setting candidate receiving section receives, in accordance with the user's gesture received by the gesture receiving section, the change in the setting candidate of the respective setting items related to the image formation by the image forming section, and
the image forming section executes image forming operation based on the setting candidate of the setting item that the setting candidate receiving section has received.

6. A computer-readable non-transitory recording medium with an information processing program stored thereon, the information processing program causing a computer including a processor to function, when the processor executes the information processing program, as:
a display control section controlling display operation of a display section, the display section displaying a setting screen that receives change in a setting candidate of a plurality of respective settable setting items;
a gesture receiving section receiving a user's gesture; and
a setting candidate receiving section receiving, in accordance with the user's gesture received by the gesture receiving section, the change in the setting candidate of the respective setting items,
wherein the information processing program further causes the computer to function so that:
the setting screen includes a scrolling display area where a predetermined scroll image is scroll-displayed in accordance with a scroll gesture received by the gesture receiving section and a shortcut button to be displayed at a position different from the scrolling display area and associated with a predetermined setting candidate of a predetermined setting item,
on the scrolling display area, a part of a setting item list composed of images listed in a scrolling direction is displayed as the predetermined scroll image, each of the images indicating a respective name of the plurality of setting items, and the setting candidate currently set is shown on each of the images indicating the respective name of the plurality of setting items,
when the gesture receiving section receives a selection gesture performed on the shortcut button, the display control section causes the display section to:
(i) display, in the setting screen, a pop-up image showing the name of the setting item and the setting candidate associated with the selected shortcut button;
(ii-i) after a predetermined time elapses from the display of the pop-up image without the gesture receiving section receiving a selection gesture performed on the pop-up image, scroll-display the setting item list displayed on the scrolling display area until an image indicating a name of the setting item associated with the selected shortcut button is displayed on the scrolling display area;
(ii-ii) move the pop-up image to a position where the image indicating the name of the setting item which is in the setting item list and associated with the selected shortcut button is displayed, and change the setting candidate currently set in the image indicating the name of the setting item associated with the selected shortcut button to the setting candidate associated with the shortcut button;
(iii) when the gesture receiving section receives the selection gesture before the predetermined time elapses from the display of the pop-up image, display a screen for changing the setting candidate of the setting item shown in the pop-up image, and
the setting candidate receiving section receives;
when the gesture receiving section receives the selection gesture performed on the shortcut button and the processes of (ii-i) and (ii-ii) are executed, the change to the setting candidate associated with the selected shortcut button; and
when the gesture receiving section receives the selection gesture performed on the shortcut button and the process of (iii) is executed, the change in the setting candidate in accordance with the user's gesture performed on the screen for changing the setting candidate of the setting item shown in the pop-up image.

* * * * *